United States Patent
Sadakane

(10) Patent No.: US 10,967,610 B2
(45) Date of Patent: Apr. 6, 2021

(54) LAMINATED GLASS

(71) Applicant: AGC Inc., Chiyoda-ku (JP)

(72) Inventor: Shunsuke Sadakane, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 324 days.

(21) Appl. No.: 15/797,006

(22) Filed: Oct. 30, 2017

(65) Prior Publication Data

US 2019/0126593 A1 May 2, 2019

(51) Int. Cl.
| | |
|---|---|
| *B32B 17/06* | (2006.01) |
| *B32B 17/10* | (2006.01) |
| *G02B 27/01* | (2006.01) |

(52) U.S. Cl.
CPC .......... *B32B 17/06* (2013.01); *B32B 17/1055* (2013.01); *B32B 17/10761* (2013.01); *B32B 17/10779* (2013.01); *G02B 27/0101* (2013.01)

(58) Field of Classification Search
None
See application file for complete search history.

(56) References Cited

U.S. PATENT DOCUMENTS

| | | | |
|---|---|---|---|
| 3,700,542 A | 10/1972 | Davis | |
| 2003/0215610 A1* | 11/2003 | DiGiampaolo | ... B32B 17/10036 428/156 |
| 2010/0314900 A1 | 12/2010 | Labrot et al. | |
| 2016/0159282 A1* | 6/2016 | Kurihara | ...................... B60J 1/02 348/148 |
| 2016/0291324 A1* | 10/2016 | Arndt | ................. B32B 17/10568 |
| 2017/0072663 A1* | 3/2017 | Sadakane | ........... G02B 27/0101 |
| 2018/0149865 A1* | 5/2018 | Arndt | ..................... G02B 27/01 |
| 2019/0084276 A1* | 3/2019 | Oota | ................. B32B 17/10036 |

FOREIGN PATENT DOCUMENTS

| | | | |
|---|---|---|---|
| JP | 07-175007 | | 7/1995 |
| JP | 2013-6731 A | | 1/2013 |
| JP | 5315358 B2 | | 10/2013 |
| WO | WO 2012/023616 A1 | | 2/2012 |
| WO | WO-2016017566 A1 | * | 2/2016 ....... B32B 17/10036 |

* cited by examiner

*Primary Examiner* — David Sample
(74) *Attorney, Agent, or Firm* — Element IP, PLC

(57) ABSTRACT

Laminated glass includes a first glass sheet; a second glass sheet; and an interlayer positioned between the first and second glass sheets, to bond the first and second glass sheets together. The laminated glass has a first area used by a head-up display, and a second area adjacent to the first area and not used by the head-up display. One or both of the first and second glass sheets are wedge-shaped. At one or more points in at least a part of an area of the second area, a wedge angle $\delta_g$ being a sum of respective wedge angles of the first and second glass sheets satisfies Formula (1):

$$\delta_g = \frac{t}{R}\frac{\sin\varphi\cos\varphi}{n^2 - \sin^2\varphi} - \eta\frac{\cos\varphi}{2\sqrt{n^2 - \sin^2\varphi}} - \delta_c - \delta_i \quad (1)$$

where t, R, n, $\varphi$, $\eta$, $\delta_c$, and $\delta_i$ are as specified in claim 1.

11 Claims, 4 Drawing Sheets

LAMINATED GLASS

BACKGROUND OF THE INVENTION

1. Field of the Invention

The present disclosure relates to laminated glass.

2. Description of the Related Art

In recent years, introduction of head-up displays (referred to as "HUD", below) has made progress, with which predetermined information is displayed in the field of vision of the driver of a vehicle, by reflecting images on the windshield of the vehicle. However, there may be cases where double images pose a problem when the driver is visually recognizing an outside scene or information displayed by the HUD.

Double images that pose problems for the driver of a vehicle may be categorized into double images in transmission and double images in reflection. If the windshield has an HUD-display area used by the HUD, and a non-HUD-display area (a transparent area) not used by the HUD, while double images in transmission may be considered as a problem in the HUD-display area although double images in reflection is a main problem; in the non-HUD-display area, double images in transmission is the problem.

It has been known that such double images in reflection or double images in transmission can be reduced by using a wedge-shaped laminated glass for the windshield. For example, laminated glass has been proposed that has two glass sheets sandwiching an interlayer, and has a wedge shape as a whole (see, for example, Japanese Laid-open Patent Publication No. 07-175007).

Meanwhile, using wedge-shaped laminated glass requires appropriately controlling change in the thickness of the laminated glass, namely, the wedge angle.

When shaping an interlayer that constitutes laminated glass to have a wedge angle, the film thickness tends to be influenced by heating and press bonding executed when processing the interlayer and in a manufacturing process of the laminated glass because the interlayer is a type of vinyl material, which is a material softer than glass in general. Therefore, it is difficult to control the wedge angle of an interlayer of laminated glass as in the case of a rigid body.

The wedge angle of an interlayer also changes depending on changes in, for example, humidity, temperature, and the like while being stored. Also, when press bonding is applied to laminated glass, since the interlayer is pressed or stretched in the thickness direction by the inner and outer glass sheets, influence of such treatment appears especially noticeable on the upper side of the windshield at which the thickness is greater, or in the case of a greater wedge angle. Also, the wedge angle changes more noticeable in an area close to black ceramic. As such, handling a wedge-shaped interlayer requires fine condition management.

On the other hand, glass is harder compared with an interlayer, and the wedge angle of glass does not easily change once it has been shaped. Therefore, compared with shaping an interlayer to have a wedge angle, shaping a glass sheet that constitutes laminated glass to have the wedge angle is more favorable because it is not necessary to excessively consider deformation of the interlayer and condition management when manufacturing the laminated glass. However, in the conventional technologies, it has not been sufficiently considered how to determine the wedge angle of such a glass sheet in laminated glass.

SUMMARY OF THE INVENTION

According to an embodiment in the present disclosure, laminated glass includes a first glass sheet; a second glass sheet; and an interlayer positioned between the first glass sheet and the second glass sheet, to bond the first glass sheet and the second glass sheet together. The laminated glass has a first area used by a head-up display, and a second area adjacent to the first area and not used by the head-up display. One or both of the first glass sheet and the second glass sheet are wedge-shaped glass. At one or more points in at least a part of an area of the second area, a wedge angle $\delta_g$ being a sum of a wedge angle of the first glass sheet and a wedge angle of the second glass sheet satisfies Formula (1) below:

$$\delta_g = \frac{t}{R} \frac{\sin\varphi\cos\varphi}{n^2 - \sin^2\varphi} - \eta \frac{\cos\varphi}{2\sqrt{n^2 - \sin^2\varphi}} - \delta_c - \delta_i \quad (1)$$

where t is a thickness of the laminated glass; R is a local curvature radius of the laminated glass; n is a refractive index of the laminated glass; $\varphi$ is a local incident angle of a ray of light incident on the laminated glass; $\eta$ is a target angle of double images in transmission, to take a value satisfying $0<|\eta|$ and $-9<\eta<9$ min at the one or more points in at least the part of the area; $\delta_c$ is a correction value of the wedge angle satisfying $0.05<\delta_c<0.3$ mrad; and $\delta_i$ is a wedge angle of the interlayer satisfying $\delta_i \leq 0.5$ mrad.

DESCRIPTION OF THE PREFERRED EMBODIMENTS

In the following, embodiments will be described with reference to the drawings.

According to the disclosed technology, it is possible to provide laminated glass that includes glass having a wedge angle suitable for reducing double images in transmission.

Throughout the drawings, the same elements are assigned the same reference symbols, and duplicated description may be omitted. Note that although a windshield for a vehicle will be taken as an example for the description here, the application is not limited as such; the glass according to the embodiments can be applied to glass other than windshield for vehicles.

[Double Images in Reflection and Double Images in Transmission]

Figure 1A:
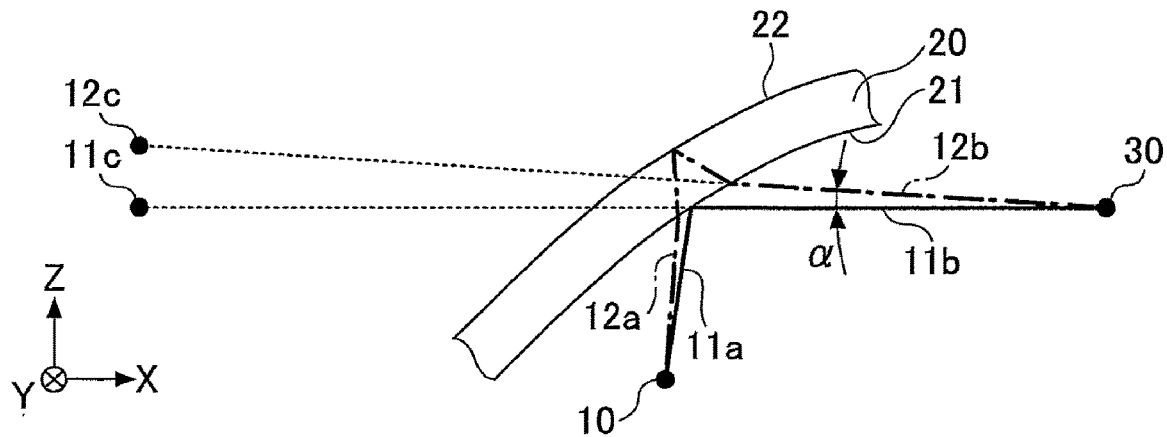
FIGS. 1A-1B are diagrams illustrating concepts of double images.
Figure 1B:
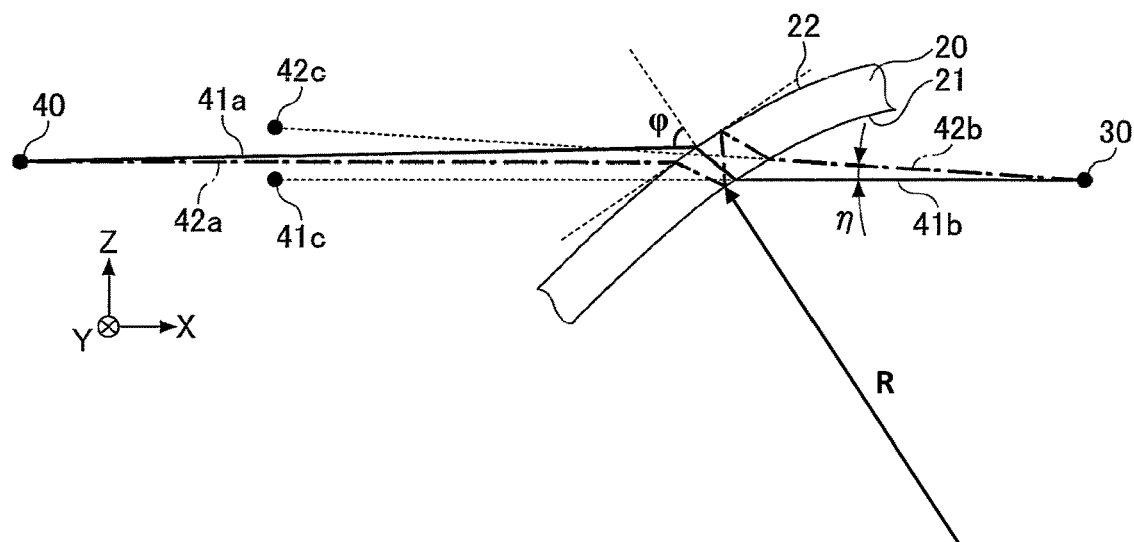

First, concepts of double images in reflection and double images in transmission will be described. FIGS. 1A-1B are diagrams illustrating concepts of double images; FIG. 1A illustrates double images in reflection, and FIG. 1B illustrates double images in transmission. Note that in FIGS. 1A-1B, X designates the front-and-rear direction of a vehicle having a windshield 20 installed, Y designates the left-and-right direction of the vehicle, and Z designates the direction perpendicular to the XY plane (the same is assumed in the following drawings).

As illustrated in FIG. 1A, a part of rays of light 11a emitted from a light source 10 of an HUD is reflected on the inner surface 21 of the windshield 20 of the vehicle, and is brought to an eye 30 of the driver as a ray of light 11b (a first beam), to be visually recognized by the driver as an image 11c (a virtual image) formed in front of the windshield 20.

Also, a part of rays of light 12a emitted from the light source 10 of the HUD is incident on the windshield 20 of the vehicle through the inner surface 21 and refracted, and a part of that is reflected on the outer surface 22. Then, further, a part of the reflected part goes out of the windshield 20 of the vehicle through the inner surface 21 with refraction, and is brought to the eye 30 of the driver as a ray of light 12b (a second beam), to be visually recognized by the driver as an image 12c (a virtual image). Note that the thickness of the windshield 20 is uniform, and the inner surface 21 and the outer surface 22 are parallel with each other.

These two images 11c and 12c visually recognized by the driver in this way constitute double images in reflection. Also, an angle formed by the ray of light 11b (the first beam) and the ray of light 12b (the second beam) is the angle α of the double images in reflection. It is more preferable that the angle α of double images in reflection is closer to zero.

Also, as illustrated in FIG. 1B, a part of rays of light 41a emitted from a light source 40 is incident, at a local incident angle φ, on the windshield 20 of the vehicle, which has a local curvature radius R, through the outer surface 22 and refracted, and a part of that goes out of the windshield 20 of the vehicle through the inner surface 21, and is brought to the eye 30 of the driver as a ray of light 41b, to be visually recognized by the driver as an image 41c.

Also, a part of rays of light 42a emitted from the light source 40 is incident on the windshield 20 of the vehicle through the outer surface 22 and refracted, and a part of that is reflected on the inner surface 21. Then, a part of the reflected part is further reflected on the outer surface 22, and further, a part of the twice reflected part goes out of the windshield 20 through the inner surface 21 with refraction, and is brought to the eye 30 of the driver as a ray of light 42b, to be visually recognized by the driver as an image 42c.

These two images 41c and 42c visually recognized by the driver in this way constitute double images in transmission. Also, an angle formed by the ray of light 41b (the first beam) and the ray of light 42b (the second beam) is the angle η of the double images in transmission. Note that η is defined to be positive if appearing upward, and negative if appearing downward. It is more preferable that the angle η of double images in transmission is closer to zero.

[Windshield (Laminated Glass)]

Figure 2:
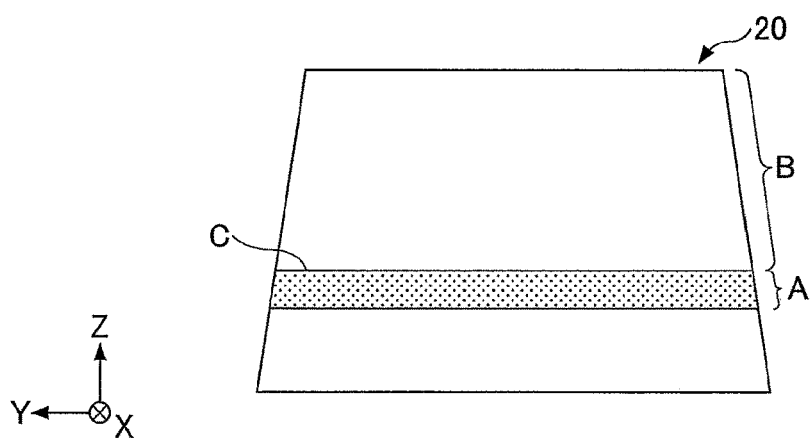
FIG. 2 is a diagram illustrating a windshield for a vehicle.
Figure 3A:
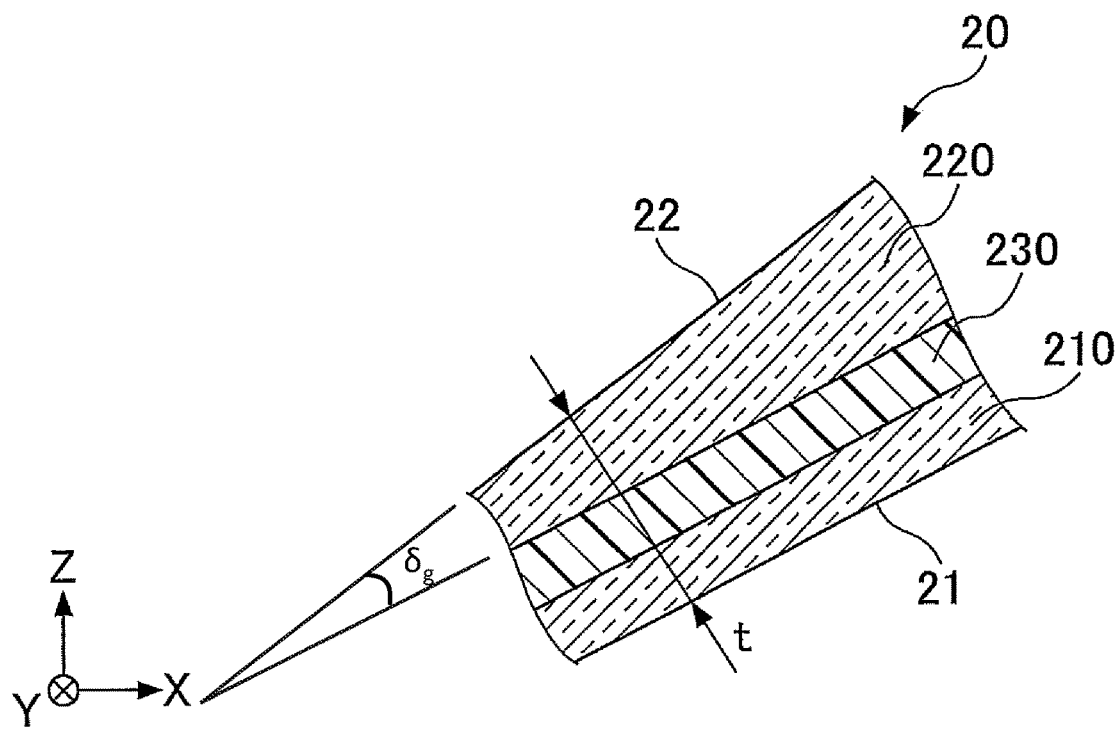
FIGS. 3A, 3B, and 3C are partial cross-sectional views parallel to the XZ plane in FIG. 2.
Figure 3B:
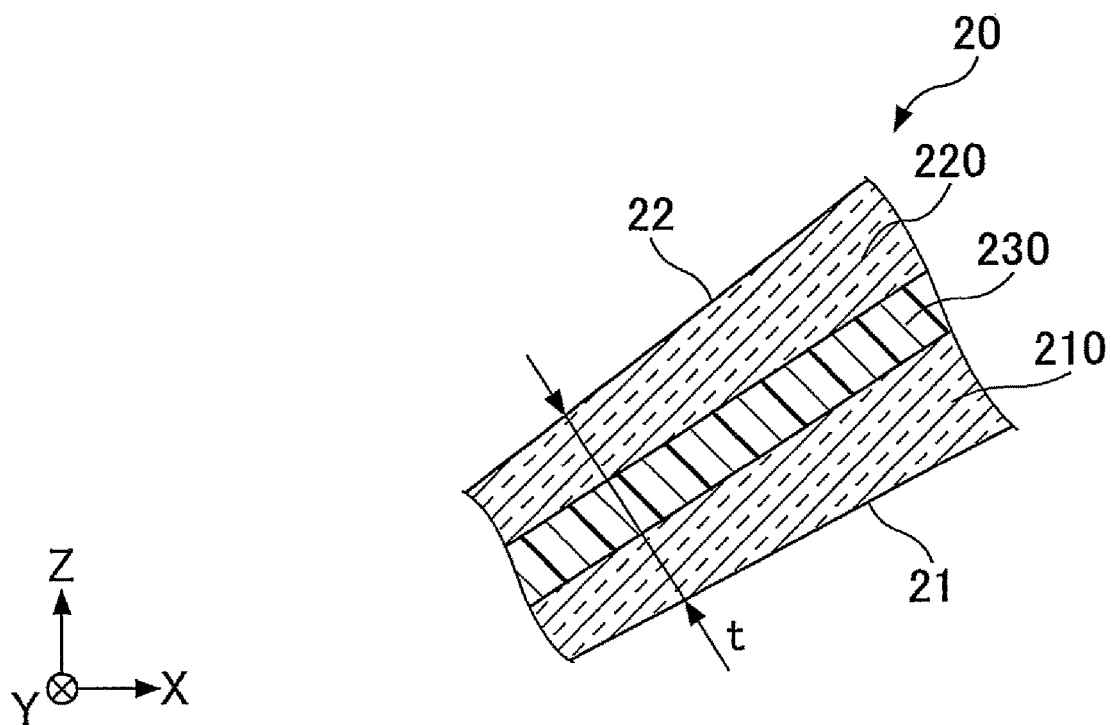

FIG. 2 is a diagram that exemplifies a windshield for a vehicle, schematically illustrating the windshield viewed from the front side of the vehicle. FIGS. 3A-3B are partial cross-sectional views parallel to the XZ plane in FIG. 2. Note that in FIG. 2, an HUD-display area A is illustrated by a pattern having small dots for convenience's sake.

As illustrated in FIG. 2, the windshield 20 includes the HUD-display area A used by the HUD, and a non-HUD-display area B (a transparent area) not used by the HUD. The HUD-display area A is positioned lower on the windshield 20, and the non-HUD-display area B is adjacent to the HUD-display area A, and positioned higher with respect to the HUD-display area A on the windshield 20. A line C represents the boundary between the HUD-display area A and the non-HUD-display area B. Note that the HUD-display area A is a representative example of a first area in the claims in the present disclosure, and the non-HUD-display area B is a representative example of a second area in the claims in the present disclosure.

As illustrated in FIG. 3A, a windshield 20 is laminated glass that includes a glass sheet 210 as a first glass sheet, a glass sheet 220 as a second glass sheet, and an interlayer 230.

In this laminated glass, the glass sheet 210 is a glass sheet that has a uniform thickness, and includes lines generated by stretching in the manufacturing process. On the other hand, the glass sheet 220 has a thickness that changes from one edge to the other edge opposite the one edge, and includes lines generated by stretching in the manufacturing process. The interlayer 230 is a film that has a uniform thickness, positioned between the glass sheet 210 and the glass sheet 220, to bond the glass sheet 210 and the glass sheet 220 together, for example, such that the lines of the glass sheet 210 and the lines of the glass sheet 220 cross at right angles.

As such, the glass sheet 220 is formed in a wedge shape in a cross-sectional view. In the glass sheet 220, an angle formed between a surface serving as the outer surface 22 of the windshield 20, and a surface that contacts the interlayer 230 is referred to as a "wedge angle $\delta_g$". The wedge angle $\delta_g$ may take a proper value depending on a position in the Z direction. For example, there may be an area where the surface serving as the outer surface 22 of the windshield 20 is parallel to the interlayer 230. A method of suitably determining the wedge angle $\delta_g$ will be described later. Note that since the thickness of the glass sheet 210 and the interlayer 230 is uniform, the wedge angle $\delta_g$ may be regarded as an angle between the inner surface 21 and the outer surface 22 of the windshield 20.

Also, the inner surface 21 of the windshield 20 as one surface of the glass sheet 210 and the outer surface 22 of the windshield 20 as one surface of the glass sheet 220 may be flat surfaces, or may be curved surfaces. The windshield 20 may have a shape, for example, curving in the vertical direction. Note that "t" represents a local thickness of the windshield 20 (a total thickness of the glass sheet 210, the glass sheet 220, and the interlayer 230 at the local position).

A glass sheet having the thickness that changes from one edge to the other edge opposite the one edge as the glass sheet 220 is obtained by adjusting conditions of a float glass process used for manufacturing the glass. Specifically, by adjusting the revolving speed of multiple rolls arranged on both edges of a glass ribbon that travels on molten metal, glass can be formed to have a concave, convex, or tapered cross section in the width direction, which may be cut to obtain a portion having a desired thickness change.

The glass sheet 210 having the uniform thickness is formed by the same float glass process as used for the glass sheet 220. However, as illustrated in FIG. 3B, the glass sheet 210 may have a wedge shape whose thickness changes from one edge to the other edge opposite the one edge. In this case, the wedge angle $\delta_g$ is the sum of respective wedge angles of the glass sheets 210 and 220. The wedge angles of the glass sheets 210 and 220 may be equivalent to each other, or may be different from each other.

Also, although the thickness of the interlayer 230 is supposed to be uniform, the interlayer 230 may have a wedge shape in a cross-sectional view, as long as a major portion of the wedge angle of the windshield 20 is formed by one or both of the glass sheets 210 and 220. A suitable wedge angle, denoted by $\delta_i$ in FIG. 3C, in the case of the interlayer 230 having a wedge shape in a cross-sectional view will be described later.

Stretching in a manufacturing process using the float glass process causes each of the glass sheets 210 and 220 to have fine stripe-shaped concavities and convexities (lines) parallel to the traveling direction. When used in a windshield for a vehicle, if the lines are arranged to be seen in a horizontal direction with respect to an observer's line of sight, distortion may become visually discernible, which worsens the visibility.

As the interlayer 230 that bonds the glass sheet 210 and the glass sheet 220 together, thermoplastic resin is often used, including, for example, plastic polyvinyl acetal resin, plastic polyvinyl chloride resin, saturated polyester resin, plastic saturated polyester resin, polyurethane resin, plastic polyurethane resin, ethylene acetic acid vinyl copolymer resin, and ethylene ethyl acrylate copolymer resin, which are thermoplastic resin conventionally used for this kind of application.

Among these, plastic polyvinyl acetal resin is suitably used because it has a superior balance of properties including transparency, weather resistance, strength, adhesive strength, penetration tolerance, impact energy absorption, moisture resistance, heat insulation, and acoustic insulation. The thermoplastic resin to be used may be of a single type, or may contain two or more types. Note that "plastic" in the above "plastic polyvinyl acetal resin" means having been plasticized by addition of a plasticizer. This is the same for the other plastic resins.

The polyvinyl acetal resin described above may include polyvinyl formal resin obtained by having polyvinyl alcohol (may be referred to as "PVA" below as necessary) react with formaldehyde; polyvinyl acetal resin in a narrow sense obtained by having PVA react with acetaldehyde; and polyvinyl butyral resin (may be referred to as "PVB" below as necessary) obtained by having PVA react with n-butyraldehyde. Among these, PVB is suitably used because of its superior balance of properties including transparency, weather resistance, strength, adhesive strength, penetration tolerance, impact energy absorption, moisture resistance, heat insulation, and acoustic insulation. Note that the polyvinyl acetal resin to be used may be of a single type, or may contain two or more types.

The light source of the HUD is normally positioned in a lower part in the vehicle compartment, and an image is projected toward the laminated glass from the part. Since the projection image is reflected on the front surface and the back surface of the glass, in order to cause both reflected images to be seen covered with each other, the thickness of the glass needs to change in parallel with the projection direction. Since the glass sheet 210 has the thickness that changes in the direction perpendicular to the lines, in order to be used as glass on which information is projected, the line direction needs to be perpendicular to the projection direction, namely, the lines need to extend in the direction horizontal with the line of sight of an observer in the vehicle compartment, which means that the glass sheet 210 needs to be arranged in the direction that would worsen the visibility.

In order to improve the visibility, in the laminated glass manufactured by using the glass sheet 210, the glass sheet 220, and the interlayer 230, the glass sheet 210 and the glass sheet 220 are arranged so that the respective lines cross at right angles. This arrangement alleviates distortion that would be discerned if using the glass sheet 210 alone, because of the existence of the glass sheet 220 having the perpendicular lines, and the interlayer 230 bonding the glass sheet 220 and the glass sheet 210 together, which improves the visibility.

Furthermore, glass for a vehicle is normally used in a state of having a curvature shape. Glass shaping is generally performed before bonding glass sheets together by an interlayer 230, by heating the glass to have a temperature of approximately 550° C. to 700° C. at which the glass becomes soft so as to form the glass in a desired shape. The degree of a curvature is referred to as "maximum curvature depth". Here, the maximum curvature depth is the length of a perpendicular line drawn from the deepest point in the bottom of the curvature of laminated glass that curves to have a convex shape, and is arranged so that the convex side faces downward, to a straight line connecting the middle points of a pair of opposite long sides of this laminated glass, which is represented by the unit of mm.

Since the stripe-shaped fine concavities and convexities generated on the surface that cause distortion when used in laminated glass are stretched in the shaping process, a greater maximum curvature depth further improves the visibility. The maximum curvature depth of the glass sheet 210 and the glass sheet 220 in the present disclosure is not necessarily limited, and is preferably 10 mm or greater, more preferably 12 mm or greater, and even more preferably 15 mm or greater

[Suitable Wedge Angle]

First, an experiment was conducted. In the experiment, as illustrated in FIG. 3A, laminated glass was produced with a glass sheet 220 as a wedge-shaped glass sheet, and a glass sheet 210 and an interlayer 230 having the uniform thickness (example). Also, for comparison, another laminated glass was produced with a glass sheet 210 and a glass sheet 220 having the uniform thickness, and an interlayer 230 as a wedge-shaped film (comparative example).

Figure 4:
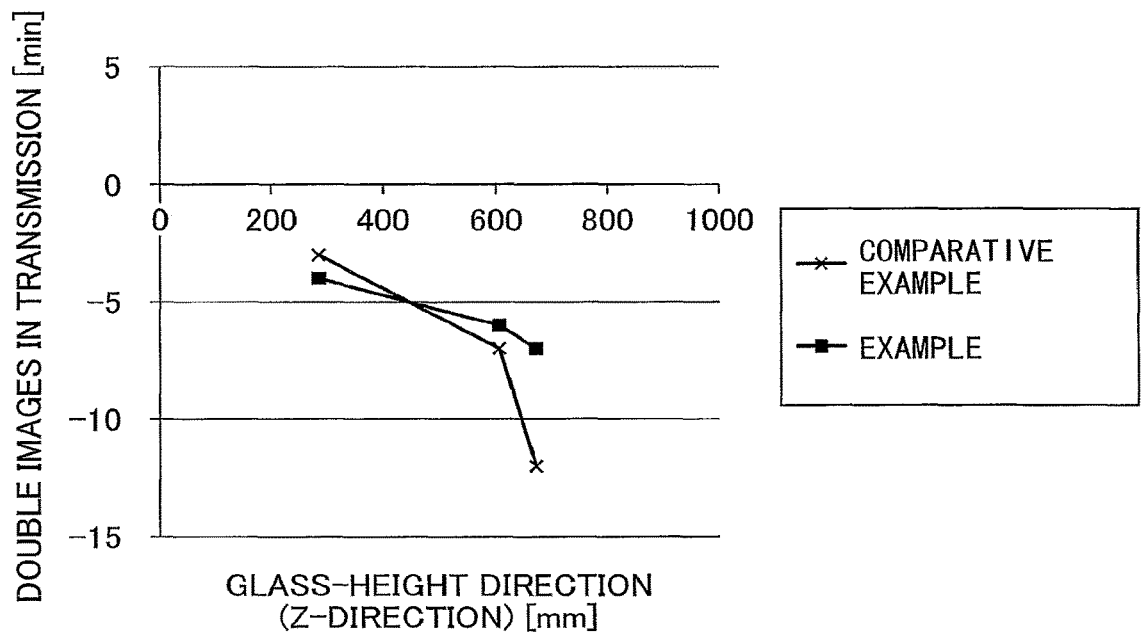
FIG. 4 is a diagram illustrating measurement results of double images in transmission of laminated glass in an example and in a comparative example.

Next, change in the Z direction (see FIG. 2) of double images in transmission was measured for each of the produced laminated glasses (for the example and the comparative example). The result is illustrated in FIG. 4 and Table 1. Note that the horizontal axis in FIG. 4 represents the "distance from the bottom side of the glass, which is set as the origin, to an upper point on the glass". Comparing the example with the comparative example by FIG. 4 and Table 1, it was understood that in the comparative example, the double images in transmission tended to become especially worse approximately over 600 mm in the Z direction.

TABLE 1

| POSITION IN Z-DIRECTION [mm] | DOUBLE IMAGES IN TRANSMISSION OF EXAMPLE [min] | DOUBLE IMAGES IN TRANSMISSION OF COMPARATIVE EXAMPLE [min] |
| --- | --- | --- |
| 286 | −4 | −3 |
| 606 | −6 | −7 |
| 671 | −7 | −12 |

From the result in FIG. 4 and Table 1, it is considered preferable to form a major portion of the wedge angle of the windshield 20 by one or both of the glass sheets 210 and 220, and to set the wedge angle of the interlayer 230 to less than or equal to a certain value (Result 1).

Figure 5:
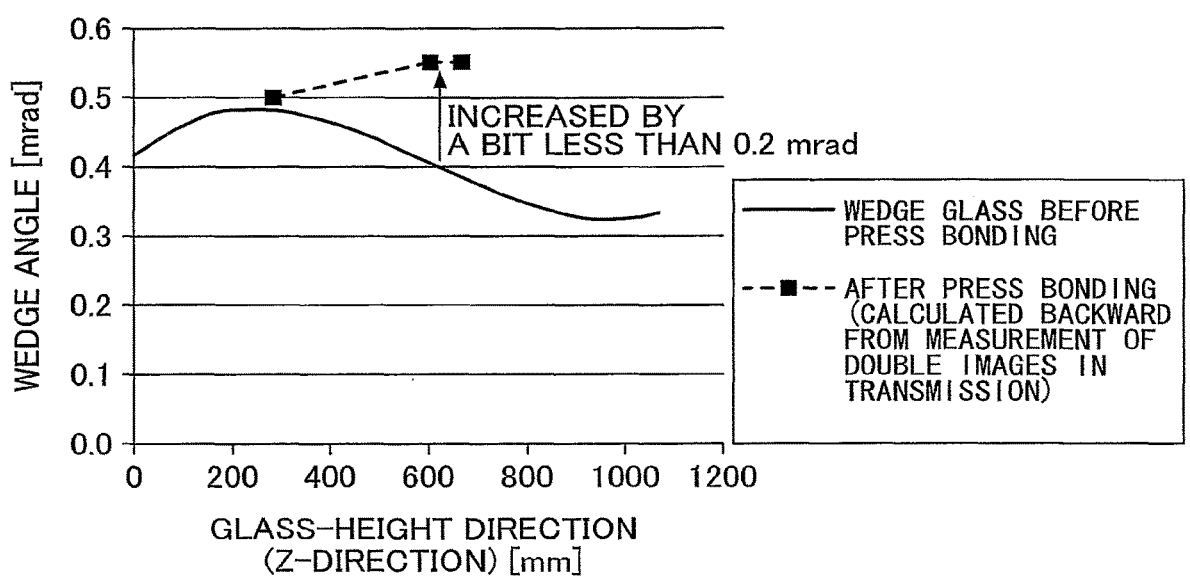
FIG. 5 is a diagram illustrating change in the wedge angle before and after press bonding.

Next, the wedge angle of the wedged-shaped glass (glass sheet 220) in the example before the press bonding (before formed in the laminated glass), and the wedge angle of the entire laminated glass after the press bonding (after formed as the laminated glass), were measured. The result is illustrated in FIG. 5. Note that the wedge angle after the press bonding was obtained by backward calculation from the measured values of the double images in transmission.

As illustrated in FIG. 5, the wedge angle changed between before and after the press bonding. Since the wedge angle of the wedged-shaped glass (glass sheet 220) can be considered unchanged before and after the press bonding, it can be considered that the change was brought by change (increase) of the wedge angle of the interlayer 230 (which had been zero before the press bonding).

From the result in FIG. 5, it is considered preferable to set in advance the wedge angle of the wedged-shaped glass to a small value, taking account of the amount of change (increase) to occur in the press bonding because the wedge angle of the interlayer 230 changes before vs. after the press bonding (Result 2).

In consideration of the above results 1 and 2, the inventors have derived a method of determining the wedge angle $\delta_g$ of the glass sheets 210 and 220 that is suitable in the non-HUD-display area B. Specifically, the laminated glass having a wedge angle suitable for reducing double images in transmission can be realized by adopting a wedge angle $\delta_g$ that satisfies the following Formula (1) at points in at least a part of the area of the non-HUD-display area B. Note that $\delta_g$ in Formula (1) may be the sum of the wedge angle of the glass sheet 210 and the wedge angle of the glass sheet 220 where one of the glass sheets may have the wedge angle of 0.

The wedge angle $\delta_g$ of the glass sheets 210 and 220 is determined by using Formula (1), for example, at each point on a vertical line that includes the HUD-display area A of the windshield 20. However, the wedge angle $\delta_g$ may also be determined by using Formula (1), for example, so that $\delta_g$ changes continuously in the horizontal direction of the windshield 20.

$$\delta_g = \frac{t}{R}\frac{\sin\varphi\cos\varphi}{n^2 - \sin^2\varphi} - \eta\frac{\cos\varphi}{2\sqrt{n^2 - \sin^2\varphi}} - \delta_c - \delta_i \qquad (1)$$

where t represents the thickness of the windshield 20, which is the laminated glass; R represents the local curvature radius of the windshield 20; n represents the refractive index of the windshield 20; φ represents the local incident angle of a ray of light incident on the windshield 20; η is the target angle of the double images in transmission; $\delta_c$ is a correction value of the wedge angle; and $\delta_i$ is the wedge angle of the interlayer 230. Note that the unit of the target angle of double images in transmission is a minute, and the unit of the wedge angle of the interlayer 230 is mrad, as adopted conventionally.

Figure 3C:
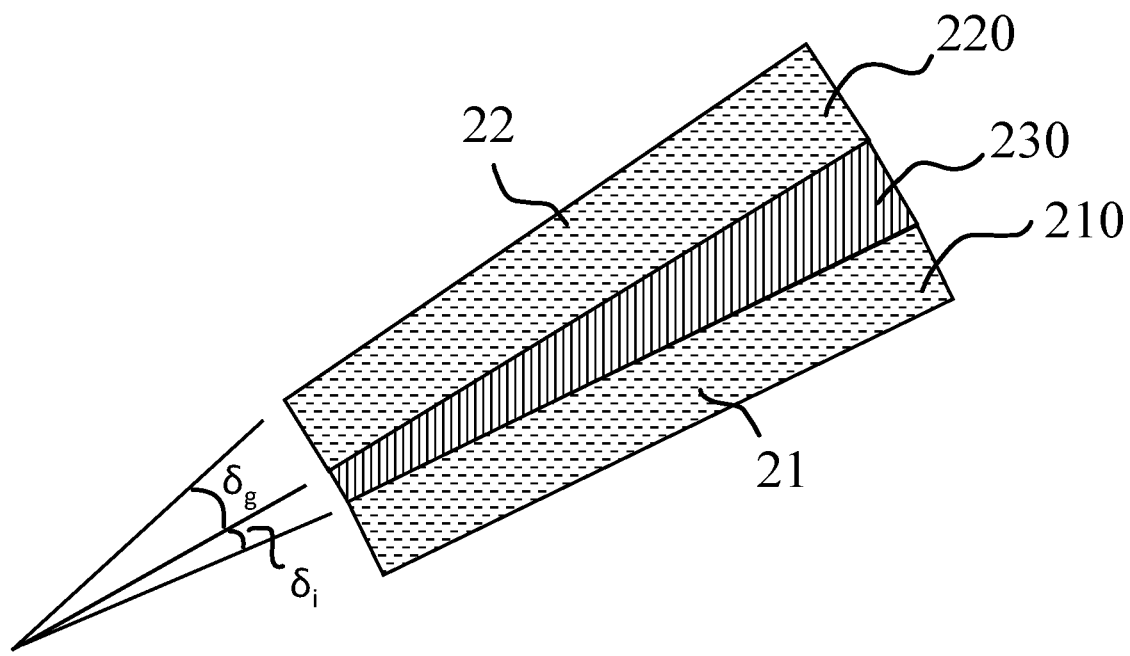

As described above, in order to control the wedge angle $\delta_i$ of the interlayer 230 appropriately, fine condition management is required. However, by forming the major portion of the wedge angle of the laminated glass by the wedge angle $\delta_g$ of the glass sheets 210 and 220, and by setting the wedge angle $\delta_i$ of the interlayer 230 to a small value, controllability of the wedge angle $\delta_i$ of the interlayer 230 does not pose a problem. In this case, the sum of the wedge angle $\delta_g$ of the glass sheets 210 and 220 and the wedge angle $\delta_i$ of the interlayer 230 corresponds to the wedge angle of the entire laminated glass. Such an embodiment is illustrated in FIG. 3C.

Furthermore, by taking account of the amount of change (increase) to occur in the press bonding, and by subtracting a correction value $\delta_c$ of the wedge angle in advance, it is possible to inhibit double images in transmission from increasing especially in the increasing direction of the glass height.

Note that as described in Japanese Patent No. 5315358, the angle of double images in transmission can be calculated following Formula (2), depending on the curvature radius and the incident angle of the ray of light. Also, a wedge angle δ necessary to remove double images having the curvature radius $R_c$ and the incident angle φ can be calculated following Formula (3). Formula (1) has been derived by the inventors based on Formulas (2) and (3) with further investigation (including the investigation shown in FIG. 4 and FIG. 5).

$$\eta = \frac{2t}{R_c}\frac{\sin\varphi}{\sqrt{n^2 - \sin^2\varphi}} \qquad (2)$$

$$\delta = \frac{t}{R_c}\frac{\sin\varphi\cos\varphi}{n^2 - \sin^2\varphi} \qquad (3)$$

Next, suitable values of η, $\delta_c$, and $\delta_i$ in Formula (1) will be described.

η is a value that becomes 0<|η| at least at one or more points in a part of the area of the non-HUD-display area B (namely, not becoming η=0 at all points in the non-HUD-display area B), and is preferably −9<η<9 min, more preferably −6<η<6 min, and most preferably 3<η<3 min.

These values are based on a result of analyzing the value of η from the viewpoint of discomfort in visual perception, which suggests that if −9<η<9 min, it will hardly raise a problem in the marketplace. The likelihood of occurrence of such a problem can be further reduced with −6<η<6 min and −3<η<3 min.

As for $\delta_i$, since a problem of difficulty in controlling the wedge angle starts occurring if exceeding 0.5 mrad, it is preferable to set $\delta_i \leq 0.5$ mrad. Also, in order to more securely avoid the problem of difficulty in controlling the wedge angle, it is more preferable to set $\delta_i \leq 0.2$ mrad.

The suitable value of $\delta_c$ was obtained experimentally. According to examination conducted by the inventors on the suitable value of $\delta_c$, it has been understood that if $\delta_c$ is set to 0.05 mrad or less, the wedge angle increases by deformation of the interlayer in the press bonding, which increases double images in transmission. Moreover, if $\delta_c$ is set to 0.3 mrad or greater, change in the thickness generated during storage of the interlayer increases double images in transmission. Therefore, it is preferable to set 0.05<$\delta_c$<0.3 mrad, and more preferable to set 0.05<$\delta_c$<0.2 mrad. Subtracting $\delta_c$ in Formula (1) enables to reduce double images in transmission not only in the comparative example, but also in the example.

Note that in terms of avoidance of defect such as double images and distortion in transmission, the periphery of the windshield 20 is less important than the center part (an area excluding the periphery of the windshield 20). Thereupon, the wedge angle $\delta_g$ may be set so as to satisfy Formula (1) at each point in an area excluding the periphery of the windshield 20 in the non-HUD-display area B. In this case, the wedge angle $\delta_g$ may be set to any value in the periphery of the windshield 20 that is less critical than the center part. The "area excluding the periphery of the windshield 20" is, for example, an area that corresponds to the test area B specified in JIS (Japanese Industrial Standard) R3212, or the test area A that is positioned further inward relative to the test area B.

In other words, in the present embodiment, "at least a part of the area of the non-HUD-display area B" is an area, for example, that corresponds to the test area A or the test area B specified by JIS R3212.

Also, a camera may be installed on an upper part of the windshield for obtaining information outside of the vehicle. In such a case, the area at which the camera is installed is normally surrounded by black ceramic (the area to which an adhesive is applied). Change of the wedge angle becomes noticeable in the boundary portion between the black ceramic and the glass, which makes condition management of the interlayer difficult.

Therefore, in the area surrounded by the black ceramic to have the camera installed, it is preferable that the wedge angle $\delta_g$ satisfies Formula (1) for reducing double images in transmission for an image obtained by the camera.

In other words, in such an application of the present embodiment, "at least a part of the area of the non-HUD-display area B" is, for example, an area surrounded by black ceramic provided for installing a camera.

In this way, in the present embodiment, at points in at least a part of the area of the non-HUD-display area B, the wedge angle of the interlayer 230 is limited to 0 or a small value (0.5 mrad or less), and the wedge angle constituted with the glass sheets 210 and 220 is made greater. This enables to inhibit a problem of the wedge angle controllability of an interlayer from occurring, and to realize laminated glass having a wedge angle suitable for reducing double images in transmission.

Specifically, by determining the wedge angle $\delta_g$ of the glass sheets 210 and 220 to satisfy Formula (1), it is possible to inhibit a problem of the wedge angle controllability of an interlayer from occurring, and to realize laminated glass having a wedge angle suitable for reducing double images in transmission. In particular, it is possible to prevent double images in transmission from becoming worse at an upper side part where the thickness of the laminated glass is greater (on the side where the glass height is higher in FIG. 4 and FIG. 5).

Note that although double images in transmission in the non-HUD-display area B have been described, in order to reduce double images in reflection in the HUD-display area A, it is preferable to set the wedge angle $\delta_q$ of the glass sheets 210 and 220 greater than or equal to 0.1 mrad, and less than or equal to 1.2 mrad.

As above, the preferable embodiments have been described in detail. Note that the present invention is not limited to the above embodiments, which may be changed and replaced in various ways without departing from the scope described in the claims.

The invention claimed is:

1. A laminated glass, comprising:
    a first glass sheet;
    a second glass sheet; and
    an interlayer positioned between the first glass sheet and the second glass sheet, to bond the first glass sheet and the second glass sheet together,
    wherein the laminated glass is curved,
    wherein the laminated glass has a first area used by a head-up display, and a second area adjacent to the first area and not used by the head-up display,
    wherein one or both of the first glass sheet and the second glass sheet are wedge-shaped glass having a thickness that changes from a first edge to a second edge, which is opposite to the first edge, and
    wherein the laminated glass is configured such that the interlayer has a wedge angle $\delta_i$ of less than or equal to 0.2 mrad, one or more points in at least a part of an area of the first area have a wedge angle $\delta_{g1}$ from 0.1 to 1.2 mrad, and one more points in at least a part of an area of the second area have a wedge angle $\delta_{g2}$ from 0.33 to 0.49 mrad, said wedge angles $\delta_{g1}$ and $\delta_{g2}$ being a sum of a wedge angle of the first glass sheet and a wedge angle of the second glass sheet, and
    wherein the wedge angles $\delta_{g1}$ and $\delta_{g2}$ are different.

2. The laminated glass as claimed in claim 1, wherein at least the part of the area of the second area corresponds to a test area A specified by JIS R3212.

3. The laminated glass as claimed in claim 1, wherein at least the part of the area of the second area corresponds to a test area B specified by JIS R3212.

4. The laminated glass as claimed in claim 1, wherein at least the part of the area of the second area is an area surrounded by black ceramic for installing a camera.

5. The laminated glass as claimed in claim 1, wherein the interlayer has a wedge angle, $\delta_i$, of 0 mrad.

6. The laminated glass as claimed in claim 4, wherein the area surrounded by the black ceramic corresponds to an upper part of the windshield when the laminated glass sheet is installed in the vehicle.

7. The laminated glass as claimed in claim 1, wherein the first area has a wedge angle $\delta_{g1}$ from 0.75-1.2 mrad.

8. The laminated glass as claimed in claim 1, wherein the first area has a wedge angle $\delta_{g1}$ from 0.8-1.2 mrad.

9. The laminated glass as claimed in claim 1, wherein one of the first glass sheet and the second glass sheet is wedge-shaped glass and the other has a uniform thickness, and wherein the interlayer has a wedge shape.

10. The laminated glass as claimed in claim 1, wherein the first area is closer to the first edge than the second area, and wherein the second area extends from at least 286 mm to 671 mm, measured from the first edge towards the second edge.

11. The laminated glass as claimed in claim 1, wherein the second area has a wedge angle $\delta_{g2}$ from 0.33 to 0.47 mrad.

* * * * *